United States Patent [19]

Libby et al.

[11] 4,314,974
[45] Feb. 9, 1982

[54] SOLVENT EXTRACTION METHOD USING STATIC MIXERS

[75] Inventors: Donald R. Libby, Magnolia; Sung J. Chen, North Andover, both of Mass.

[73] Assignee: Chemineer, Inc., Dayton, Ohio

[21] Appl. No.: 34,805

[22] Filed: Apr. 30, 1979

[51] Int. Cl.$^3$ ............................................. C01G 43/00
[52] U.S. Cl. ....................................... 423/8; 210/634; 423/24; 423/63; 423/139
[58] Field of Search ................................ 423/8–10, 423/24, 63, 139; 210/21

[56] References Cited

U.S. PATENT DOCUMENTS

| | | | |
|---|---|---|---|
| 3,167,402 | 1/1965 | Samuelson et al. | 423/8 |
| 3,254,048 | 5/1966 | Schaub et al. | 260/33.6 |
| 3,643,927 | 2/1972 | Crouch | 259/4 |
| 3,704,006 | 11/1972 | Grout et al. | 259/4 |
| 3,837,501 | 9/1974 | Pielkenrood | 210/522 |
| 3,857,919 | 12/1974 | Hazen et al. | 423/9 |
| 3,872,209 | 3/1975 | Hazen et al. | 423/24 |
| 3,942,765 | 3/1976 | Hendrickson | 259/4 R |
| 4,039,404 | 8/1977 | Richards et al. | |
| 4,053,141 | 10/1977 | Gussefeld | 366/339 |
| 4,054,529 | 10/1977 | Pielkenrod | 210/521 |
| 4,061,313 | 12/1977 | Brauner et al. | 366/340 |
| 4,067,902 | 1/1978 | Werges | 260/561 N |
| 4,188,361 | 2/1980 | Rowden | 423/9 |
| 4,190,633 | 2/1980 | Smith et al. | 423/8 |

FOREIGN PATENT DOCUMENTS

44751/72 1/1974 Australia.

OTHER PUBLICATIONS

"Experimental Study of Copper Extraction with LIX-64N by Means of Motionless Mixers"–Ind. Eng. Chem. Process Des. Dev. 1980, pp. 91–97.
Godfrey et al., "Co-Current Flow Systems for Liquid–Liquid Extraction", *Chemistry and Industry*, Oct. 7, 1978, pp. 745–748.
Perry et al., "Chemical Engineers' Handbook", 5th Ed., pp. 21, -4, -11 & -12, McGraw-Hill Book Co. (1973) New York, TP155, P. 4, 1973.
Herst et al., "Recovery of Uranium from Wet Process Phos. Acid by Extr. w/Octylphenylphos. Acid", *Ind. Eng. Proc. Des. Dev.*, 13 (#3) (1974).

*Primary Examiner*—Edward A. Miller
*Attorney, Agent, or Firm*—Biebel, French & Nauman

[57] ABSTRACT

An improved liquid-liquid solvent extraction system is provided having a mixing stage which includes a mixing device for creating a dispersion of the two liquid phases followed by a residence chamber designed to enhance contacting and mass transfer between the solute and solvent phases. The separating stage includes a drop size conditioning device which establishes a drop size in the discontinuous liquid phase of the dispersion which can be separated easily from the continuous liquid phase in the succeeding settling stage of the device. The drop size conditioning device also acts to reduce entrainment of the solvent phase in the solute phase during separation of the phases. The settling device may contain a series of baffles to reduce the time required for phase separation and to reduce entrainment of the solvent phase in the solute phase.

The system is used to extract metal ions such as uranium, copper, cobalt, nickel, and vanadium from aqueous process streams containing dilute concentrations of such ions. Hydrocarbon solvents which are partially or totally immiscible in water are used to extract the metal ions and may contain additives such as complex-forming agents to aid in the mass transfer of metal ions to the solvent phase. After contacting and separation of the phases, the metal ions are recovered from the hydrocarbon solvent.

6 Claims, 8 Drawing Figures

SOLVENT EXTRACTION METHOD USING STATIC MIXERS

BACKGROUND OF THE INVENTION

The present invention relates to solvent extraction, and more particularly to a mixing and separating apparatus and process for recovering metals and other materials from solution.

Solvent extraction involves the selective separation of one or more chemical components of a liquid solution. Although there are many variations in techniques of solvent extraction, the principal method utilized involves mass transfer between two immiscible liquid phases, usually an organic phase and an aqueous phase. Solvent extraction is accomplished by using two liquids in which the component desired to be extracted, termed the key component, has a different solubility and/or is selectively soluble with respect to other dissolved components. A solvent is chosen to contact the key component containing solution, into which the key component is either preferentially or selectively soluble. To enhance both the rate of solution and degree of solubility of the key component in the solvent, chemical complexes may be formed in one or both of the liquid phases, or conventional chemical reactions may occur. Such combinations of mass transfer and complex formation or reaction influence the overall rate of extraction.

The solvent extraction process involves bringing a solvent and a solution containing a key component into intimate contact, separating the two phases, and recovering the key component from the solvent phase. Several factors are involved which affect the overall rate of extraction. Among them are the interfacial area between the two liquid phases, their interfacial surface tension, concentration differentials between the phases, temperature, pressure, and amount of agitation. For example, reducing the drop size of the discontinuous liquid phase dispersed within the continuous liquid phase increases the interfacial area of contact for a given volume. However, the maximization of one factor may have an adverse effect on a different part of the overall process. A highly dispersed system in the mixer stage of the process will increase mass transfer, but at the expense of an increasingly lengthy and expensive separation of the phases later in the process.

Basic equipment for carrying out solvent extraction is well known. The simplest extraction system need have only a mixer followed by a settling tank. However, few extractions can be carried out efficiently with only a single contacting stage. Most solvent extraction operations utilize multiple contact systems in either batch or continuous operation. Contacting has typically been accomplished through use of baffleplate mixers, agitated stirrers, packed towers or plate columns. Separation is done usually by gravity settling or centrifugation.

Recently, motionless mixers have been utilized in solvent extraction operations including recovery of metals from aqueous process streams. These devices are termed motionless mixers because they have no moving parts. Mixing is accomplished by pumping one or more fluids through a conduit containing baffles, spirals, or twisted vanes. For example, Australian Pat. No. 449,240 discloses the extraction and recovery of uranium, copper, cobalt and vanadium from aqueous solutions using a motionless mixing device. Likewise, Henrickson, U.S. Pat. No. 3,942,765, teaches use of an extraction device combining a motionless mixing device having triangular shaped vanes with a settling device to extract and recover copper from a dliute aqueous solution.

However, neither of those references address the problem of maximizing extraction efficiency while maintaining an easily separable dispersion of the solvent and solute phases of a two-phase immiscible liquid system. A need exists in the art for a solvent extraction system in which contacting of the two liquid phases is maximized for maximum extraction efficiency while at the same time, ease of separability of the mixed phases is attained.

SUMMARY OF THE INVENTION

The present invention provides both a novel mixer stage and novel separator stage for use in liquid-liquid solvent extraction operations. The mixer stage comprises means to create a dispersion of the desired drop size of the discontinuous phase in the continuous phase, followed by a residence chamber to permit contacting of the phases to occur for a time which will maximize extraction efficiency. The dispersion creating means is a short residence time device and flow of the liquids through it may be either essentially plug flow, backmix flow, or a combination of the two. Examples of devices which will create a dispersion having essentially plug flow through the device are motionless mixers such as those disclosed by Armeniades et al, U.S. Pat. No. 3,286,922, or the above-mentioned Henrickson patent, mixing jets, orifices, valves, or other similar flow restricting devices such as baffles. Examples of dispersion creating devices which produce backmix flow are mechanically or sonically agitated vessels.

The residence chamber following the dispersing means is designed to permit sufficient contact time between the dispersed phases for more complete mass transfer. Liquid solvent extraction systems which are easily dispersed can use a minimum sized dispersing means having a short residence time. However, because mass transfer between the phases takes place at a finite rate, the residence chamber following the dispersing means provides the required time for contact to occur before separation of the phases.

The device for the residence chamber may be a substantially vertical container such as a vertical section of pipe or other vertically oriented vessel or tank. Flow through the residence chamber is designed so that the flow rate closely matches the separation rate of the dispersed phase from the continuous phase. That is, the more dense phase will tend to migrate downwardly while the less dense phase will tend to travel in the opposite direction. Depending upon the particular solvent extraction system being run through the residence chamber, the relative densities of the phases and which phase is being run as the continuous phase, will dictate the direction of flow and flow rate through the residence chamber. The chamber is designed so that flow rate and direction of flow will match the tendency of the phases to migrate apart and will result in substantially no phase separation during the time spent in the residence chamber.

For example, if the less dense phase is run as the continuous phase in the solvent extraction, flow through the residence chamber may be downward. The system is then designed so that the downward flow of the continuous phase is equal to or slightly greater than the drop velocity of the discontinuous, heavy (i.e., more dense) phase. In this manner, no phase separation would occur, and essentially plug flow would be maintained through the system. If, however, backmixing was desired, flow through the residence chamber could be designed to go upwardly through the chamber. In this manner, the heavy phase would tend to flow countercurrent to the upwardly moving continuous phase. Alternatively, the residence chamber may be agitated to maintain the dispersion and/or promote backmixing.

Depending upon the particular solute and solvent used in the system, the mixing stage may be designed to have a plurality of dispersing means and/or residence chambers to optimize mass transfer between the phases. That is, the mixing stage may be designed to have as many dispersing means and residence chambers in series as is necessary to promote the desired mass transfer between phases.

The novel separator stage of the invention also comprises two separate elements, a drop conditioner and a settling chamber. The drop conditioner re-establishes or changes the size of the drops in the discontinuous phase of the dispersion coming from the mixing stage of the solvent extraction system so that the resulting drop size distribution in the dispersion is more easily separated than the dispersion entering from the mixing stage. Because of the ability of this invention independently to control drop size of the discontinuous phase at both the mixing and separator stages of the system, the system can be designed to maximize the amount of mass transfer taking place in the mixing stage and yet minimize both the time necessary to separate the phase and the entrainment of one phase in the other.

The device used for the drop conditioner is also a motionless mixer, and preferably is a motionless mixer of the type disclosed by Armeniades et al, U.S. Pat. No. 3,286,992, and Grout et al, U.S. Pat. No. 3,704,006. These motionless mixers have the ability to control closely the ultimate drop size distribution in a solvent extraction system by controlling the flow rate through, and residence time in, such mixers. Once a narrow range of drop sizes has been established and relatively small, difficult to separate droplets have been eliminated by coalescence to form larger drops, separation is enhanced since the settler is designed to separate this specific drop size distribution.

The device used for the settler may either be a gravity or centrifugal settler. A gravity settler may be in the form of either a horizontal or vertical pipe in which the flow velocity of the overall system is substantially less than the drop velocity of the dispersed phase moving through the continuous phase. The addition of baffles in the settler will enhance phase separation.

As with the mixing stage of the device, the settling stage may include a plurality of drop conditioners and/or residence chambers prior to the settling chamber to enhance the separability of the phases and to reduce entrainment of the solvent phase in the solute phase. A number of drop conditioners and residence chambers in series may be required for particularly difficult to separate solvent-solute systems.

The solvent extraction system of the present invention is useful in the recovery of metal ions from aqueous process streams containing dilute concentrations of such ions. Examples of metals which are recoverable through use of the solvent extraction techniques of this invention are uranium, copper, cobalt, nickel and vanadium. Hydrocarbon solvents which are either partially or totally immiscible in water such as kerosene, heptane, octane, benzene, toluene, xylene, chlorinated hydrocarbons, methyl ethyl ketone and naphthalene are useful in the practice of the invention. Additives such as quinoline and oxime compounds will improve the extraction efficiency of the overall process.

Accordingly, it is an object of this invention to provide improved mixing and separating stages in a liquid solvent extraction system; it is another object of this invention to provide a residence chamber following a mixer to increase the extraction efficiency of the mixer stage of a liquid solvent extraction system; it is another object of this invention to provide a drop size conditioner immediately preceding a settler in the separating stage of a liquid solvent extraction system to decrease both entrainment of the discontinuous liquid phase in the continuous liquid phase and time for separation of the phase; it is still another object of this invention to provide an improved process for the extraction of metals from liquid solutions. These and other objects and advantages of the invention will become apparent from the following description, the accompanying drawings, and the appended claims.

DESCRIPTION OF THE PREFERRED EMBODIMENTS

Figure 1:
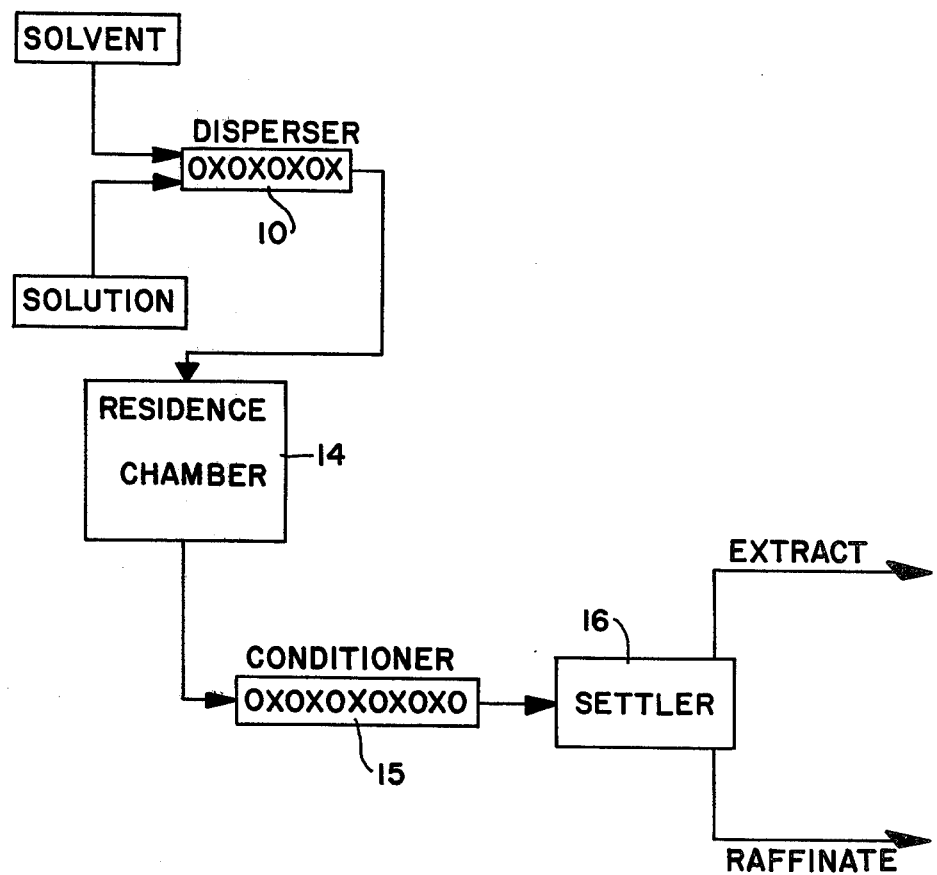
FIG. 1 is a schematic flow diagram of an overall solvent extraction apparatus according to the present invention.

As illustrated in FIG. 1, solvent and a solution containing an extractable metal ion or other material are mixed in a dispersion producing means identified as the dispenser 10. The mixing apparatus, dispenser 10, can be an agitated or sonic mixing device or any of several motionless mixing devices or flow restricting devices such as orifices, valves, or baffles. In a preferred embodiment, the mixing apparatus is the motionless mixing device described n Armeniades et al, U.S. Pat. No. 3,286,992, and illustrated in FIGS. 2 and 3.

Figure 2:
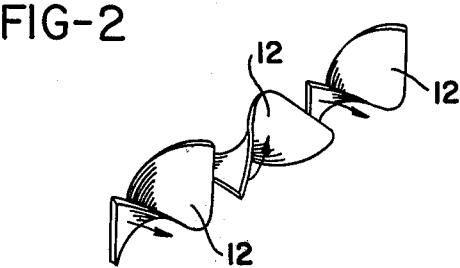
FIG. 2 is a perspective view of the preferred mixer elements used in the practice of the invention.
Figure 3:
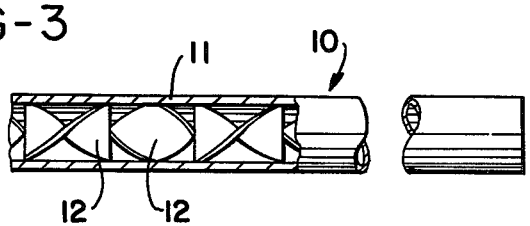
FIG. 3 is a partially cut away diagrammatic representation of mixer elements of FIG. 2 positioned in a conduit.

As shown in FIGS. 2 and 3, the device 10 is in the form of a hollow conduit 11 of cylindrical crosssection containing a plurality of curved, sheet-like elements 12. Each of the elements 12 is a flat sheet which is twisted so that the upstream and downstream edges of each element 12 are at a substantial angle to each other. This angle may vary from about 60° to about 210°. The twist of the elements shown in FIGS. 2 and 3 is about 180°. Also, each successive element 12 is twisted so the upstream edge of one element will be at a substantial angle from the downstream edge of the preceding element. A 90° angle of orientation is shown in FIGS. 2 and 3. Finally, the twist of each successive element may be reversed from the twist of the element preceding it.

That is, the elements may be arranged in alternating left-handed and right-handed curvature groups, or alternatively, a series of left-handed elements could be followed by a series of right-handed elements.

The elements are preferably the width of the inner diameter conduit and have a length of up to several times their width. The elements may be separate entities although it is desired that they be physically connected to maintain proper orientation for optimum mixing. By controlling the above factors, as well as the number of elements and velocity of the fluid through the motionless mixer, a dispenser 10 can be designed which will produce an optimum drop size of solute in solvent for mass transfer to occur.

Referring back now to FIG. 1, the dispersed fluids are then conveyed to a residence chamber 14 which is designed to permit sufficient contacting time for mass transfer of the metal ion or other material to occur from the solute to the solvent phase, and preferably for the system to reach equilibrium. The residence chamber 14 may comprise a vertically oriented container or length of pipe, or in certain cases where the two phases are so dispersed that little if any separation will occur, the residence chamber can be of any convenient configuration which will promote and prolong contact between the dispersed phases.

For most solvent extraction operations where the solvent phase is an organic liquid less dense than the solute phase, the residence chamber 14 will be a vertical chamber with flow designed to go downwardly through the chamber. In this manner, the downward flow of the continuous solvent phase will closely match the tendency of the heavier solute phase to migrate downwardly and any substantial separation of the phases will be prevented. Specific parameters for the residence chamber such as chamber size and flow rate through the chamber will depend on the particular solvent and solute in the system. It has been found that a residence chamber-to-mixer cross-sectional area ratio of at least 4 to 1 will ensure no significant separation of the dispersed phases and yet permit sufficient contact time for mass transfer between the phases to occur.

As shown in FIG. 1, after the dispersed phases have passed through the residence chamber 14, they are then redispersed in a drop size conditioner 15 to establish a mean drop size in the discontinuous phase which will enable easier separation of the phases. The drop size conditioner also serves the purpose of reducing entrainment of the continuous phase liquid in the discontinuous phase liquid. Preferably, the drop conditioner is a hollow conduit containing mixing elements as illustrated in FIGS. 2 and 3. Such a design will produce a narrow range distribution of drop sizes which facilitate separation in the settler.

However, the design parameters of the drop size conditioner may be quite different from the disperser in the mixing stage of the process. For example, in those solvent extraction systems in which quite small drop sizes are required for the desired amount of mass transfer to take place in the mixing stage, the result may be an emulsion or stable, noncoalescing dispersion which is difficult to separate. The mixing action of the drop size conditioner 15 can then be designed to cause contacting and coalescence of the very small drops and produce a new, larger mean drop size distribution in the dispersion which is more easily separated in the settling stage. Moreover, the mixing action of the drop size conditioner has been found to reduce entrainment of the continuous phase in the discontinuous phase due to coalescence of entrained liquid through increased contact with the continuous liquid phase.

Finally, as illustrated in FIG. 1, the conditioned dispersion from the conditioner 15 enters a settling chamber 16 which may be either a gravitational or centrifugal settler. For most solvent extraction operations, gravitational separation in a horizontal pipe settler has been found to produce good results. Additionally, the inclusion of bafflers in the settler has been found to reduce entrainment of organic liquid in the aqueous liquid phase and the entrainment of water in the organic phase.

Figure 4:
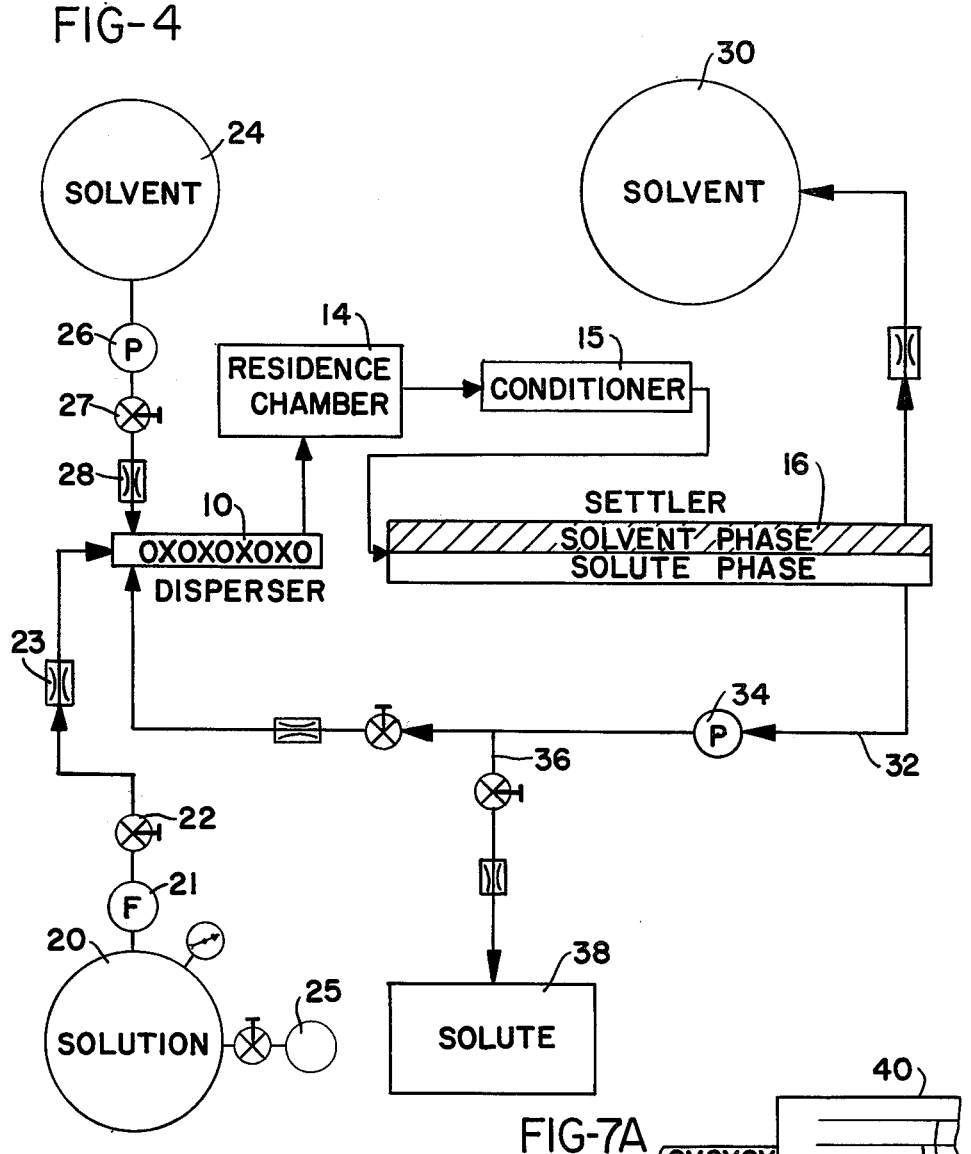
FIG. 4 is a schematic flow diagram of the solvent extraction apparatus set up for recycle of the aqueous phase.

The solvent extraction apparatus of the present invention can also be set up to recycle the solute phase as illustrated in FIG. 4. In this manner, improved stripping of metal ions from the solute phase to the solvent phase is achieved. This is because the recycle of the major portion of the solute stream results in a multi-pass operation where the effective solvent to solute ratio is greatly increased.

As illustrated in FIG. 4, solute containing strippable metal ions is pumped from a reservoir 20, through a filter 21, a metering valve 22, and a flow meter 23 into the mixing section, consisting of the disperser 10 and chamber 14. The solution may optionally be maintained under pressure from an inert gas source 25 to prevent oxidation. At the same time solvent is pumped from a second reservoir 24 by a pump 26 through a metering valve 27 and flow meter 28 into the inlet of mixing section. There, both streams are mixed with a recycle stream containing the major portion of solute passing through the system in the separating stage consisting preferably of the conditioner 15 and settler 16, solvent is collected in tank 30 and may then be sent to a metal recovery operation prior to its own recycle back to reservoir 24. Solute is pumped through line 32 via pump 34 back to the mixing section of the system. Only a small portion of the solute phase is removed from the system via line 36 to a collection tank 38. In this manner, the system can be operating at a 0.5 to 1 or 1 to 1 solvent to solute ratio in the mixing stage of the system, and yet the overall system will be operating on an overall solvent to solute ratio on the order of 10/1 to 100/1. Use of such a high overall solvent to solute ratio enables attainment of equilibrium operation while using a short residence time mixing stage.

The process of the present invention is illustrated by the following examples which are in no way to be construed as limitative of the invention.

EXAMPLE I

A series of liquid extractions were carried out on uranium-containing aqueous phosphoric acid streams. The organic liquid extraction agent was a Kermac 470B solution, a mixture of hydrocarbons containing approximately 34% paraffins, 49% naphthenes, and 17% aromatics available from Kerr-McGee Corp. containing 0.5 diethylhexyl phosphoric acid and 0.125 M tri-n-octylphosphine oxide. The following general test parameters were utilized:

| | |
|---|---|
| Flow Velocities | 1.3–2.3 feet per second |
| Continuous Phase | Organic (O/A ratios of 0.5/1 to 2.7/1) |
| Mixer Diameter | 0.602 inches I.D. |
| Number of Mixer Elements | 12 to 72 |
| Residence Chambers | 3 inch I.D., horizontal |

-continued

| | |
|---|---|
| Residence Times | and vertical 1 to 9 seconds |
| Settling Time | 10 minutes |

All measurements of uranium concentrations in both the organic and aqueous process streams were made using the Colorado School of Mines colorimetric technique which utilizes tributyl phosphate in isooctane to extract uranyl ions from an aluminum nitrate solution. Color is developed by introducing an aliquot of the extract into an acetone-water solution of dibenzoylmethane and pyridine. The lower limit for uranium analysis using this method is 25 ppm. All entrainment measurements of organic in the aqueous phase were made using a Perkin Elmer Model 137G Infrared Spectrophotometer. This method of measurement is accurate to within t 5 ppm. The results of the tests are reported in Table I as follows:

TABLE I

| Test No. | No. of Mixing Elements | Velocity (fps) | Residence chambers | Residence Time (sec) | Organic/ Aqueous Ratio | Temp. (°C.) |
|---|---|---|---|---|---|---|
| 1 | 24 | 2.2 | none | 1.4 | 2.7/1 | 42 |
| 2 | 72 | 2.2 | " | 4.1 | 2.3/1 | 33 |
| 3 | 72 | 1.9 | " | 4.7 | 2.6/1 | 36 |
| 4 | 72 | 1.8 | " | 4.8 | 1.8/1 | 40 |
| 5 | 72 | 2.1 | " | 4.4 | 2.6/1 | 39 |
| 6 | 72 | 1.9 | " | 4.7 | 2.6/1 | 32 |
| 7 | 12 | 1.9 | 3" Hor. | 8.1 | 2.2/1 | 41 |
| 8 | 12 | 2.0 | 3" Hor. | 7.4 | 2.3/1 | 45 |
| 9 | 12 | 1.9 | 3" Vert. | 7.5 | 2.5/1 | 42 |
| 10 | 12 | 1.6 | 3" Vert. | 7.5 | 2.6/1 | 40 |
| 11 | 12 | 2.1 | 3" Vert. | 7.0 | 0.6/1 | 45 |
| 12 | 12 | 2.0 | 3" Vert. | 7.8 | 2.3/1 | 45 |
| 13 | 12 | 1.9 | 3" Hor. | 8.0 | 2.4/1 | 44 |
| 14 | 12 | 1.9 | 3" Hor. | 8.0 | 2.5/1 | 45 |

| Test No. | Entrainment org. in aq. (ppm) | Uranium in Aq. Feed (ppm) | Uranium from Mixer - Aq. (ppm) | Uranium Org. feed (ppm) | Uranium after Mixer (ppm) | % Extraction |
|---|---|---|---|---|---|---|
| 1 | 55 | 180 | 55 | 0 | 62 | 69 |
| 2 | 102 | 177 | 25 | 0 | 75 | 86 |
| 3 | 127 | 177 | 30 | 0 | 68 | 83 |
| 4 | 290 | 195 | 60 | 0 | 90 | 68 |
| 5 | 120 | 195 | 40 | 0 | 83 | 81 |
| 6 | 82 | 190 | 35 | 0 | 63 | 81 |
| 7 | 90 | 191 | 40 | 26 | 95 | 79 |
| 8 | 72 | 191 | 37 | 31 | 95 | 80 |
| 9 | 75 | 220 | 83 | 31 | 101 | 61 |
| 10 | 45 | 217 | 81 | 30 | 91 | 61 |
| 11 | 127 | 210 | 131 | 37 | 180 | 35 |
| 12 | 82 | 210 | 43 | 33 | 116 | 80 |
| 13 | 67 | 183 | 67 | 25 | 101 | 63 |
| 14 | 35 | 152 | 55 | 37 | 77 | 63 |

TABLE I-A

| Test No. | No. of Mixing Elements | Velocity (fps) | Residence chambers | Residence Time (sec) | Organic/ Aqueous Ratio | Temp. (°C.) |
|---|---|---|---|---|---|---|
| 15 | 72 | 2.0 | none | 4.6 | 2.4/1 | 50 |
| 16 | 72 | 2.0 | " | 4.4 | 2.4/1 | 44 |
| 17 | 72 | 2.0 | " | 4.6 | 2.6/1 | 39 |
| 18 | 72 | 1.9 | " | 4.7 | 2.4/1 | 38 |
| 19 | 72 | 1.9 | " | 4.7 | 2.2/1 | 21 |
| 20 | 72 | 2.2 | " | 4.1 | 0.56/1 | 43 |
| 21 | 12 | 1.8 | " | 1.4 | 2.2/1 | 41 |
| 22 | 12 | 1.9 | " | 1.6 | 2.6/1 | 41 |
| 23 | 12 | 1.3 | " | 2.3 | 2.1/1 | 41 |
| 24 | 12 | 1.8 | 3" Hor. | 8.5 | 2.4/1 | 41 |
| 25 | 12 | 2.0 | 3" Vert. | 7.6 | 2.3/1 | 43 |

| Test No. | Entrainment Org. in aq. (ppm) | Uranium in Aq. Feed (ppm) | Uranium from Mixer - Aq. (ppm) | Uranium Org. feed (ppm) | Uranium after Mixer (ppm) | % Extraction |
|---|---|---|---|---|---|---|
| 15 | 290 | 180 | 75 | 40 | 82 | 58 |
| 16 | 97 | 180 | 61 | 40 | 97 | 67 |
| 17 | 140 | 180 | 61 | 40 | 103 | 67 |
| 18 | 100 | 150 | 40 | 35 | 62 | 73 |
| 19 | 80 | 186 | 46 | 38 | 121 | 75 |
| 20 | 300 | 186 | 100 | 38 | 198 | 46 |
| 21 | 60 | 186 | 66 | 30 | 93 | 64 |
| 22 | 40 | 186 | 72 | 30 | 82 | 58 |
| 23 | 20 | 172 | 95 | 30 | 94 | 45 |
| 24 | 37 | 172 | 70 | 30 | 95 | 59 |
| 25 | 50 | 172 | 74 | 30 | 95 | 59 |

As can be seen, the extraction efficiencies achieved using only 12 mixing elements in combination with a residence chamber compare favorably to a more expensive mixer having 72 mixing elements and no residence chamber, over a range of organic phase to aqueous phase ratios.

EXAMPLE II

Figure 5:
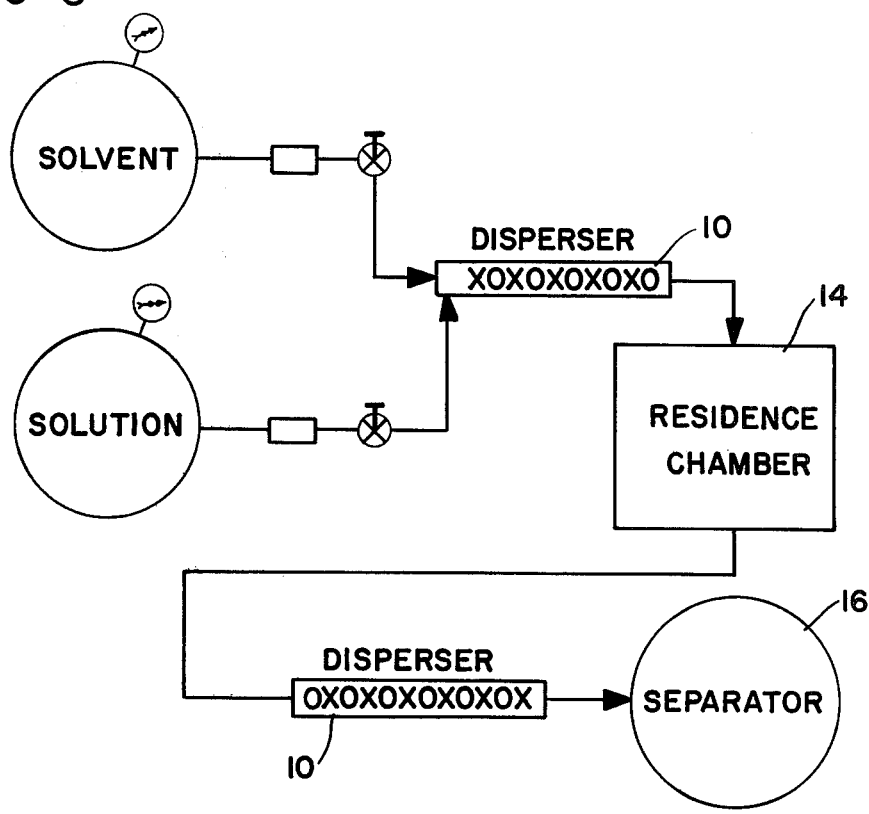
FIG. 5 is a schematic flow diagram of another embodiment of the mixer portion of the apparatus.

Again, a series of liquid extractions were carried out on uranium containing aqueous phosphoric acid streams. The organic liquid extraction agent was the same as in Example I. The apparatus was arranged as illustrated in FIG. 5. The following general test parameters were utilized:

| | |
|---|---|
| Flow Velocities | 1.8–2.4 feet per second |
| Continuous Phase | Organic |
| Mixer Diameter | 0.25 inch I.D. |
| Number of Mixer Elements | 48 |
| Residence Chamber (where indicated) | 1 inch I.D., 14 inches long (vertical) |
| Residence Times | 1.5 to 12 seconds |
| Settling Time | 10 minutes |

The results of the tests are reported in Table II as follows:

TABLE II

| Test No. | Velocity (fps) | Residence Chamber | Residence Time (sec) | Organic/ Aqueous Ratio | Temp. (°C.) | Entrainment Org. in Aq. (ppm) |
|---|---|---|---|---|---|---|
| 26 | 1.8 | No | 1.6 | 2.4/1 | 38 | 40 |
| 27 | 2.0 | " | 1.5 | 2.0/1 | 38 | 87 |
| 28 | 2.2 | " | 1.4 | 2.0/1 | 39 | 48 |
| 29 | 2.2 | " | 1.4 | 2.5/1 | 37 | 40 |
| 30 | 2.1 | " | 1.4 | 2.5/1 | 36 | 35 |
| 31 | 2.0 | " | 1.5 | 0.28/1 | 37 | 115 |
| 32 | 2.3 | " | 1.3 | 2.65/1 | 35 | 33 |
| 33 | 2.4 | " | 1.2 | 2.45/1 | 39 | 58 |
| 34 | 2.0 | " | 1.5 | 2.23/1 | 39 | 77 |
| 35 | 2.0 | " | 1.5 | 2.2/1 | 37 | 60 |
| 36 | 2.0 | " | 1.5 | 2.4/1 | 36 | 65 |
| 37 | 2.1 | " | 1.4 | 2.5/1 | 37 | — |
| 38 | 2.2 | " | 1.4 | 2.9/1 | 33 | — |
| 39 | 2.1 | " | 1.4 | 1.8/1 | 37 | — |

| Test No. | Uranium in feed (ppm) | Uranium from mixer (ppm) | Uranium org. feed (ppm) | Uranium in org. from mixer (ppm) | % Extraction |
|---|---|---|---|---|---|
| 26 | 165 | 102 | 148 | 185 | 38 |
| 27 | 165 | 86 | 154 | 205 | 48 |
| 28 | 165 | 85 | 154 | 213 | 48 |

TABLE II-continued

| | | | | | |
|---|---|---|---|---|---|
| 29 | 166 | 65 | 63 | 123 | 61 |
| 30 | 166 | 61 | 66 | 119 | 63 |
| 31 | 166 | 111 | 63 | 316 | 33 |
| 32 | 165 | 48 | 0 | 57 | 71 |
| 33 | 165 | 35 | 0 | 61 | 78 |
| 34 | 165 | 101 | 141 | 186 | 39 |
| 35 | 166 | 97 | 144 | 187 | 41 |
| 36 | 85 | 74 | 61 | 69 | 13 |
| 37 | 90 | 49 | 170 | 201 | 46 |
| 38 | 83 | 34 | 170 | 202 | 58 |
| 39 | 83 | 50 | 182 | 190 | 48 |

TABLE II-A

| Test No. | Velocity (fps) | Residence Chamber | Residence Time (sec) | Organic/ Aqueous Ratio | Temp. (°C.) | Entrainment Org. in Aq. (ppm) |
|---|---|---|---|---|---|---|
| 40 | 2.2 | No | 1.4 | 3.0/1 | 36 | 65 |
| 41 | 2.0 | " | 1.5 | 2.8/1 | 34 | — |
| 42 | 2.4 | " | 1.2 | 2.6/1 | 39 | 60 |
| 43 | 2.0 | " | 1.5 | 2.2/1 | 39 | 50 |
| 44 | 2.2 | " | 1.4 | 1.5/1 | 40 | 140 |
| 45 | 2.3 | " | 1.3 | 1.1/1 | 37 | 87 |
| 46 | 2.2 | Yes | 1.2 | 2.7/1 | 33 | — |
| 47 | 2.1 | " | 1.2 | 2.2/1 | 37 | — |
| 48 | 2.3 | " | 1.2 | 0.36/1 | 35 | — |
| 49 | 2.2 | " | 1.2 | 0.64/1 | 42 | 112 |
| 50 | 2.1 | " | 1.2 | 0.5/1 | 39 | 75 |
| 51 | 2.0 | Yes | 1.2 | 2.5/1 | 34 | 57 |
| 52 | 2.1 | Yes | 1.2 | 2.3/1 | 35 | — |
| 53 | 1.9 | No | 1.5 | 0.57/1 | 39 | — |
| 54 | 2.2 | No | 1.4 | 2.6/1 | 36 | — |

| Test No. | Uranium in feed (ppm) | Uranium from mixer (ppm) | Uranium org. feed (ppm) | Uranium in org. from mixer (ppm) | % Extraction |
|---|---|---|---|---|---|
| 40 | 158 | 113 | 223 | 246 | 28 |
| 41 | 158 | 106 | 233 | 247 | 33 |
| 42 | 165 | 99 | 235 | 257 | 40 |
| 43 | 165 | 100 | 235 | 254 | 39 |
| 44 | 167 | 110 | 237 | 288 | 35 |
| 45 | 167 | 91 | 235 | 320 | 45 |
| 46 | 169 | 81 | 243 | 276 | 52 |
| 47 | 169 | 90 | 243 | 297 | 47 |
| 48 | 169 | 114 | 243 | 421 | 33 |
| 49 | 167 | 105 | 153 | 281 | 38 |
| 50 | 167 | 98 | 153 | 309 | 41 |
| 51 | 167 | 71 | 153 | 201 | 58 |
| 52 | 165 | 72 | 151 | 202 | 57 |
| 53 | 165 | 112 | 151 | 276 | 32 |
| 54 | 165 | 85 | 151 | 195 | 48 |

As shown in Table II, the extraction efficiency is dependent on the concentration of uranium in the respective aqeuous and organic feed streams. The higher the concentration of uranium in the organic feed stream, the lower the extraction efficiency. However, direct comparison of runs having substantially the same uranium concentrations in both the aqueous and organic feed streams shows that using the same number of mixing elements, the apparatus with a residence chamber has a 9–12% greater extraction efficiency than the apparatus without a residence chamber. This can be seen by comparing runs 46 and 52 (with residence chamber) with runs 42 and 54 (without residence chamber), respectively.

EXAMPLE III

Figure 6:
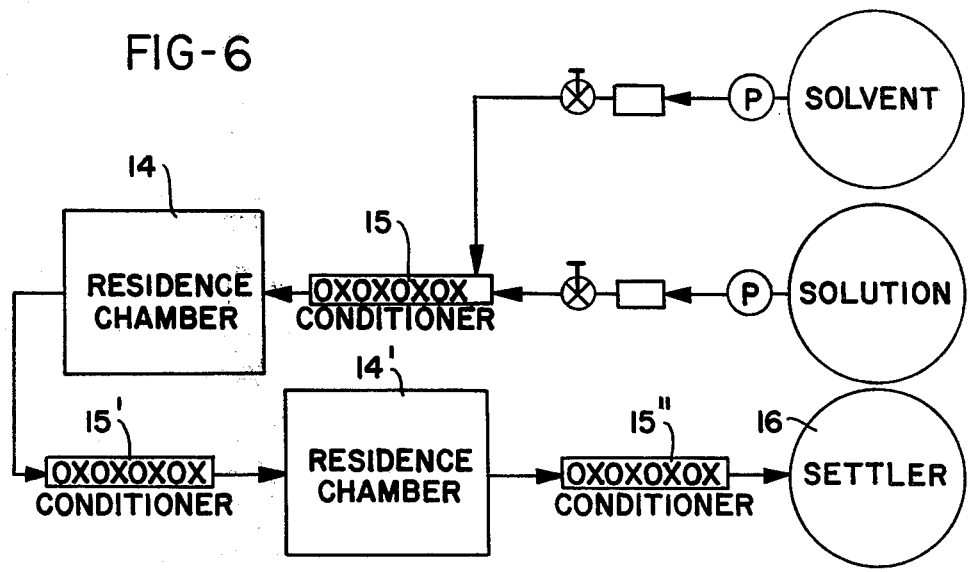
FIG. 6 is a schematic flow diagram of another embodiment of the drop size conditioning and separation portion of the apparatus.

A test was made to determine the effect of the drop size conditioning elements of the apparatus on entrainment of organic in the aqeuous phase of a process stream. The organic phase was Kermac 470B and Lix 64, a hydroxy oxime compound, available from General Mills. The aqueous phase was Ranchers electrolyte, a loaded 5 N $H_2SO_4$ solution available from Ranchers, Inc. containing approximately 40 gm/l of copper. The apparatus was set up as illustrated in FIG. 6 with the solvent and solute being pumped through a 6 element drop conditioner 15, a first residence chamber 14, a second 6 element drop conditioner 15', a second residence chamber 14', and finally through a third 6 element drop conditioner 15''. The drop conditioners were 0.602 inch I.D. mixers whose elements had an L/D ratio of 1.5 to 1.0. The residence chambers were 3 inch I.D. by 11 inches long.

Other pertinent parameters:

| | |
|---|---|
| Total Flow rate | 2/06 gpm |
| Mixer Velocity | 2.31 fps |
| O/A Ratio | 3.06 to 1 |
| Phase Continuity | Organic |
| Interfacial Tension | 18.0 dynes/cm |
| Exit Temperature | 35° C. |
| Residence Time in System | 20 sec. |
| Settler | 500 ml separatory funnel |

A sample of the above aqueous solution which had previously been cycled through a standard extraction process was found to have 95 ppm organic entrained in it. Measurement was made by infrared spectrophotometry as in previous Examples. This aqueous sample was then passed through the apparatus shown in FIG. 6. The amount of organic entrained in an aqueous sample after 10 minutes of settling time was measured to be only 41 ppm, a reduction in entrainment of 56%.

EXAMPLE IV

Figure 7A:
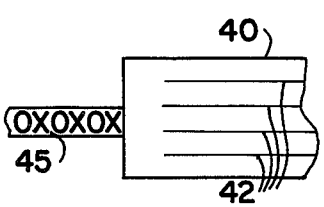
FIG. 7A and 7B are a schematic representation of settlers with baffles, as used in the present invention.
Figure 7B:
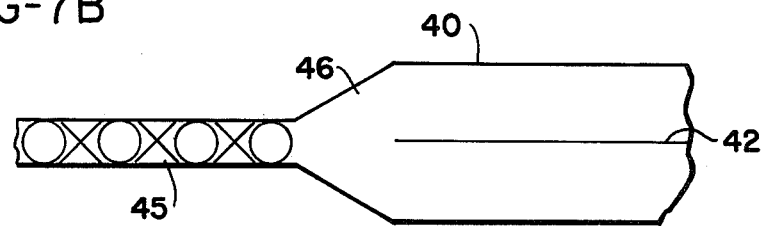

The effect of employing one or more parallel horizontally oriented baffles in a settler was investigated to determine the improvement in phase separation time and the reduction in entrainment of the organic phase in the aqueous phase. In this test, the two phases were passed through a 48 element, ½" inside diameter mixer, followed by a settler chamber having a 3" inside diameter and a 10 foot length. Two test set-ups were employed as illustrated respectively in FIGS. 7A and 7B in which the settler tube is identified by the reference numeral 40, the baffles are identified by the reference numeral 42, and the mixer is identified by the reference numeral 45. FIG. 7A shows the 3" diameter settler 40 leading abruptly from the mixer 45 while FIG. 7B shows the insertion of a conical transition stage 46 between the mixer 45 and the settler 40. FIG. 7B corresponds to apparatus used in Test 59, as identified in Table III, in which only a single baffle 42 was employed.

Kerosene was employed as the organic phase while water was the aqueous phase. Entrainment was measured by the same infrared spectrophotometry technique as in the previous examples. The organic was run as the continuous phase, and the average temperature was 25° C.

TABLE III

| Test No. | Mixer Velocity (fps) | O/A Mixer | Flow Rate gpm Total | Area Ratio Settler/Mixer | Total Test Time | Baffle Configuration | Settler Residence Time (min.) | Entrainment from exit sample Lppm |
|---|---|---|---|---|---|---|---|---|
| 55 | 2.70 | 3.2/1 | 1.70 | 36/1 | 35 | Baffles 0°; 12" from entrance | 2.2 | 94 |
| 56 | 1.92 | 3.2/1 | 1.20 | 36/1 | 32 | Baffles 0°; 12" from entrance | 3.0 | 26 |
| 57 | 2.70 | 3.2/1 | 1.70 | 36/1 | 40 | No Baffle | 2.2 | 131 |
| 58 | 1.90 | 3.3/1 | 1.18 | 36/1 | 30 | " | 3.0 | 34 |
| 59 | 2.70 | 3.2/1 | 1.70 | 36/1 | 29 | 30° smooth transition; single 0° baffle | 2.2 | 105 |

The employment of the baffles 42 horizontal to the flow of the dispersed phases in the settling chamber 40, and spaced 12 inches from the entrance, as defined in Test 55 and 56 resulted in a reduction in entrainment of about 30% from that of Tests 57 and 58 in which the baffles 42 were not employed. In Test 59, the 30° conical section 46 was employed as shown in FIG. 7B, but only a single baffle 42 was used, resulting in a reduction of entrainment as compared to Test 57 of approximately 20%. It was therefore concluded that the employment of baffles as above defined in the settler substantially enhanced the reduction of entrainment with a corresponding reduction in residence time within the settler.

While the methods and apparatus herein described constitute preferred embodiments of the invention, it is to be understood that the invention is not limited to these precise apparatus and methods, and that changes may be made in either without departing from the scope of the invention, which is defined in the appended claims.

What is claimed is:

1. A process for recovering a metal ion from aqueous solutions containing dilute solutions of such metal ion comprising the steps of:
   initially mixing said aqueous solution with a solvent extraction liquid immiscible with said aqueous solution to create a dispersion of drops of aqueous solution of a size in said extraction liquid which will maximize the mass transfer which occurs between said drops of aqueous solution and said extraction liquid;
   maintaining, without further mixing, said dispersion for a time sufficient for mass transfer of said metal ion from said aqueous solution to said extraction liquid to occur;
   further mixing said dispersion of drops of aqueous solution in extraction liquid to establish a narrow range of drop sizes within said dispersion which will minimize both the time necessary for separation of said drops of aqueous solution from said extraction liquid and the entrainment of said drops of aqueous solution in said extraction liquid;
   separating said drops of aqueous solution from said extraction liquid; and
   recovering said metal ion from said extraction liquid.

2. The process of claim 1, including recycling said aqueous solution from the separating step to the mixing step.

3. The process of claim 2 where the liquids are initially mixed by flowing said aqueous solution and said extraction liquid through a conduit containing a plurality of curved, sheet-like elements extending longitudinally in said conduit and each having a curvature to turn the direction phases flowing through said conduit, said elements being arranged in alternating right-handed and left-handed groups, the leading and trailing edges of adjacent elements being disposed at a substantial angle with respect to each other.

4. The process of claim 3 where after the mixing step the dispersion is maintained by flowing said dispersion through a vertically oriented chamber having a cross-sectional area at least four times that of the conduit in which mixing occurred and at a rate substantially matching the rate of separation of the dispersed aqueous solution from the extraction liquid.

5. The process of claim 4 where a narrow range of drop sizes of aqueous solution in said extraction liquid is established during said further mixing step and prior to separation of the dispersion by flowing said dispersion through a conduit containing a plurality of curved, sheet-like elements extending longitudinally in said conduit and each having a curvature to turn the direction of phases flowing through said conduit, said elements being arranged in alternating right-handed and left-handed groups, the leading and trailing edges of adjacent elements being disposed at a substantial angle with respect to each other.

6. The process of claim 5 where said metal ion is selected from the group consisting of uranium, copper, vanadium, cobalt, and nickel.

* * * * *